(12) United States Patent
Obiagwu et al.

(10) Patent No.: US 11,029,386 B2
(45) Date of Patent: Jun. 8, 2021

(54) VEHICLE SENSOR OPERATION

(71) Applicant: Ford Global Technologies, LLC, Dearborn, MI (US)

(72) Inventors: Francis Obiagwu, Warren, MI (US); John Moore, Canton, MI (US); Jiguo Song, Plymouth, MI (US); Soodeh Dadras, Dearborn, MI (US); Sai Srikar Palukuru, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 4 days.

(21) Appl. No.: 16/507,696

(22) Filed: Jul. 10, 2019

(65) Prior Publication Data
US 2021/0011115 A1  Jan. 14, 2021

(51) Int. Cl.
| | | |
|---|---|---|
| *G08B 21/00* | (2006.01) | |
| *G01S 7/00* | (2006.01) | |
| *G07C 5/08* | (2006.01) | |
| *G07C 5/00* | (2006.01) | |
| *G08G 1/0962* | (2006.01) | |
| *G01S 17/931* | (2020.01) | |
| *G05D 1/02* | (2020.01) | |
| *G05D 1/00* | (2006.01) | |

(52) U.S. Cl.
CPC ............ *G01S 7/003* (2013.01); *G01S 17/931* (2020.01); *G07C 5/008* (2013.01); *G07C 5/085* (2013.01); *G08G 1/0962* (2013.01); *G05D 1/0088* (2013.01); *G05D 1/0231* (2013.01)

(58) Field of Classification Search
CPC ....... G01S 7/003; G01S 17/931; G07C 5/085; G07C 5/008; G08G 1/0962; G05D 1/0088; G05D 1/0231
USPC ....................................................... 340/901
See application file for complete search history.

(56) References Cited

U.S. PATENT DOCUMENTS

| | | | |
|---|---|---|---|
| 2009/0214024 A1* | 8/2009 | Schneider | H04L 9/0625 |
| | | | 380/28 |
| 2010/0039258 A1* | 2/2010 | Cho | G08B 25/14 |
| | | | 340/541 |
| 2017/0328993 A1* | 11/2017 | Warke | G01S 17/36 |
| 2018/0069977 A1* | 3/2018 | Komura | H04N 1/00838 |
| 2019/0011556 A1* | 1/2019 | Pacala | G01S 7/4863 |
| 2019/0035145 A1 | 1/2019 | Hill | |
| 2019/0043201 A1 | 2/2019 | Strong et al. | |
| 2019/0046373 A1 | 2/2019 | Coulter et al. | |
| 2019/0079171 A1* | 3/2019 | Hwang | G01S 7/4876 |
| 2019/0107623 A1* | 4/2019 | Campbell | G01S 17/931 |
| 2019/0195990 A1* | 6/2019 | Shand | G01S 7/4861 |

FOREIGN PATENT DOCUMENTS

RU         2567469 C2    11/2015

* cited by examiner

*Primary Examiner* — Mark S Rushing
(74) *Attorney, Agent, or Firm* — Frank A. MacKenzie; Bejin Bieneman PLC

(57) ABSTRACT

A computer includes a processor and a memory, the memory storing instructions executable by the processor to arrange data collected by a plurality of sequentially arranged emitters in a sensor according to a nonsequential numerical order of the emitters, transmit the nonsequential numerical order to a vehicle computer according to a secure protocol, and transmit the data to the vehicle computer.

14 Claims, 4 Drawing Sheets

VEHICLE SENSOR OPERATION

BACKGROUND

Sensors collect data around a vehicle and transmit the data to a vehicle computer. The vehicle computer can use the data to operate one or more vehicle components. The data can include data of, e.g., a roadway, objects on and/or adjacent to the roadway, other vehicles, etc. The computer can construct a virtual representation of the surrounding environment with the data.

DETAILED DESCRIPTION

Figure 1:
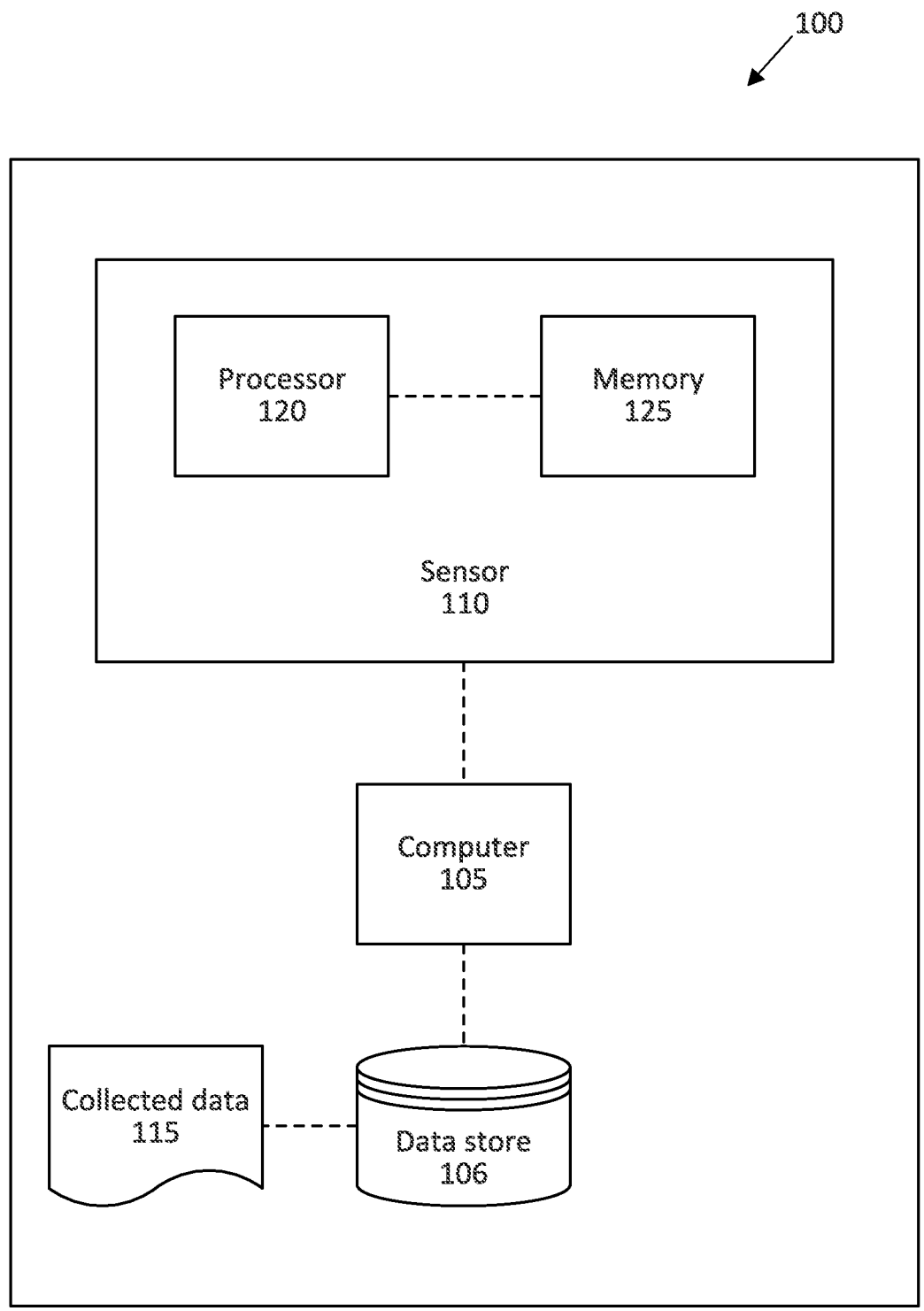
FIG. 1 is a diagram of an example system for operating a lidar sensor in a vehicle.

A system includes a sensor and a vehicle computer. The sensor includes a plurality of sequentially arranged emitters. The vehicle computer is in communication with the sensor. The system includes means for arranging data collected by the emitters according to a nonsequential numerical order of the emitters, means for transmitting the nonsequential numerical order according to a secure protocol, and means for transmitting the data to the vehicle computer.

The system can further include means for reading the transmitted data according to the transmitted nonsequential numerical order.

The system can further include means for transmitting a plurality of packets of data, each packet having respective data arranged according to a different nonsequential numerical order.

Each emitter can be arranged at a different angle relative to an axis extending between a base of the sensor and a top of the sensor.

The system can further include means for identifying the angle of each emitter based on a number in the nonsequential numerical order corresponding to the emitter.

A system includes a computer including a processor and a memory, the memory storing instructions executable by the processor to arrange data collected by a plurality of sequentially arranged emitters in a sensor according to a nonsequential numerical order of the emitters, transmit the nonsequential numerical order to a vehicle computer according to a secure protocol, and transmit the data to the vehicle computer.

The vehicle computer can be programmed to read the transmitted data according to the transmitted nonsequential numerical order.

The vehicle computer can be programmed to generate a point cloud based on the data.

The instructions can further include instructions to transmit a plurality of packets of data, each packet having respective data arranged according to a different nonsequential numerical order.

The instructions can further include instructions to actuate the emitters in the nonsequential numerical order.

The vehicle computer can be programmed to send an acknowledgment receipt to the computer upon receiving the nonsequential numerical order.

The sensor can be a lidar.

Each emitter can be arranged at a different angle relative to an axis extending between a base of the sensor and a top of the sensor.

The computer can be programmed to identify the angle of each emitter based on a number in the nonsequential numerical order corresponding to the emitter.

The instructions can further include instructions to determine the nonsequential numerical order with a random number generator program.

A method includes arranging data collected by a plurality of sequentially arranged emitters in a sensor according to a nonsequential numerical order of the emitters, transmitting the nonsequential numerical order to a vehicle computer according to a secure protocol, and transmitting the data to the vehicle computer.

The method can further include transmitting a plurality of packets of data, each packet having respective data arranged according to a different nonsequential numerical order.

The method can further include actuating the emitters in the nonsequential numerical order.

The method can further include identifying the angle of each emitter based on a number in the nonsequential numerical order corresponding to the emitter.

The method can further include determining the nonsequential numerical order with a random number generator program.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Lidar sensors emit lasers from a plurality of emitters to identify surfaces of objects near a vehicle. By identifying the objects, the vehicle can move along a roadway while avoiding the objects. The lidar sensors collect data and transmit the data to a vehicle computer. Encryption of the data can delay transmission of the data and require additional computations by the lidar sensor, increasing power consumption of the lidar sensor. To protect the data from interception during transmission to the vehicle computer, the lidar sensor can arrange the data from each emitter in a nonsequential numerical order. An eavesdropper intercepting the data would not likely be able to rearrange the data into the correct numerical order, and the resulting point cloud would not likely show the objects near the vehicle, improving security of the data. The lidar sensor can transmit the nonsequential numerical order to the vehicle computer with a secure protocol (e.g., with encryption). Because the nonsequential numerical order takes less space in computer memory than the data, encrypting the nonsequential numerical order would not significantly increase the amount of computations by the lidar sensor. The vehicle computer can read the transmitted data according to the nonsequential numerical order to detect objects near the vehicle.

FIG. 1 illustrates an example vehicle 100. The vehicle 100 includes a computer 105. The computer 105 is programmed to receive collected data 115 from one or more sensors 110. For example, vehicle 100 data 115 may include a location of the vehicle 100, data about an environment around a vehicle 100, data about an object outside the vehicle such as another vehicle, etc. A vehicle 100 location is typically provided in a conventional form, e.g., geo-coordinates such as latitude and longitude coordinates obtained via a navigation system that uses the Global Positioning System (GPS). Further examples of data 115 can include measurements of vehicle 100 systems and components, e.g., a vehicle 100 velocity, a vehicle 100 trajectory, etc.

The computer 105 is generally programmed for communications on a vehicle 100 network, e.g., including a conventional vehicle 100 communications bus. Via the network, bus, and/or other wired or wireless mechanisms (e.g., a wired or wireless local area network in the vehicle 100), the computer 105 may transmit messages to various devices in a vehicle 100 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network, which, as described below, may include various wired and/or wireless networking technologies, e.g., cellular, Bluetooth®, Bluetooth® Low Energy (BLE), wired and/or wireless packet networks, etc.

When the computer 105 partially or fully operates the vehicle 100, the vehicle 100 is an "autonomous" vehicle 100. For purposes of this disclosure, the term "autonomous vehicle" is used to refer to a vehicle 100 operating in a fully autonomous mode. A fully autonomous mode is defined as one in which each of vehicle propulsion, braking, and steering are controlled by the computer 105. A semi-autonomous mode is one in which at least one of vehicle propulsion, braking, and steering are controlled at least partly by the computer 105 as opposed to a human operator. In a non-autonomous mode, i.e., a manual mode, the vehicle propulsion, braking, and steering are controlled by the human operator.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 100 may operate as sensors 110 to provide data 115 via the vehicle 100 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, lidar, and/or ultrasonic transducers. Each sensor 110 can include a processor 120 and a memory 125. The processor 120 collects data 115 and transmits the data 115 to the computer 105.

Collected data 115 can include a variety of data collected in a vehicle 100. Examples of collected data 115 are provided above, and moreover, data 115 are generally collected using one or more sensors 110, and may additionally include data calculated therefrom in the computer 105. In general, collected data 115 may include any data that may be gathered by the sensors 110 and/or computed from such data. The data 115 can be stored in the memory 125 and/or the data store 106.

Figure 2:
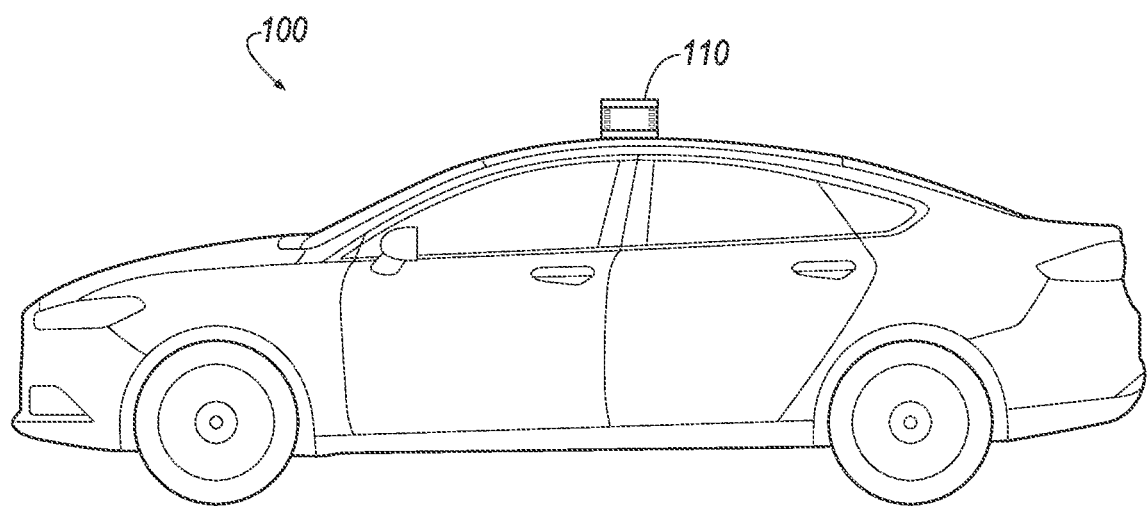
FIG. 2 is a side view of an example vehicle with the lidar sensor.

FIG. 2 is a side view of an example vehicle 100 with a lidar sensor 110. The lidar sensor 110 emits a laser and receives light reflected from an object (not shown) near the vehicle 100. Based on the received light, the computer 105 can determine a distance between the vehicle 100 and the object, as described below. The vehicle 100 can include a plurality of lidar sensors 110 to obtain data 115 to identify objects in an environment around the vehicle 100. The lidar sensor 110 can be disposed on a roof of the vehicle 100 to collect data 115 around the vehicle 100 without interference from the vehicle 100 body. Upon detecting objects near the vehicle 100, the computer 105 can actuate one or more components to avoid and/or mitigate interactions with the objects. For example, the computer 105 can actuate a brake to slow and/or stop the vehicle 100 upon approaching an object in front of the vehicle 100. In another example, the computer 105 can actuate a steering component to steer the vehicle 100 into an adjacent roadway lane to avoid the object.

Figure 3:
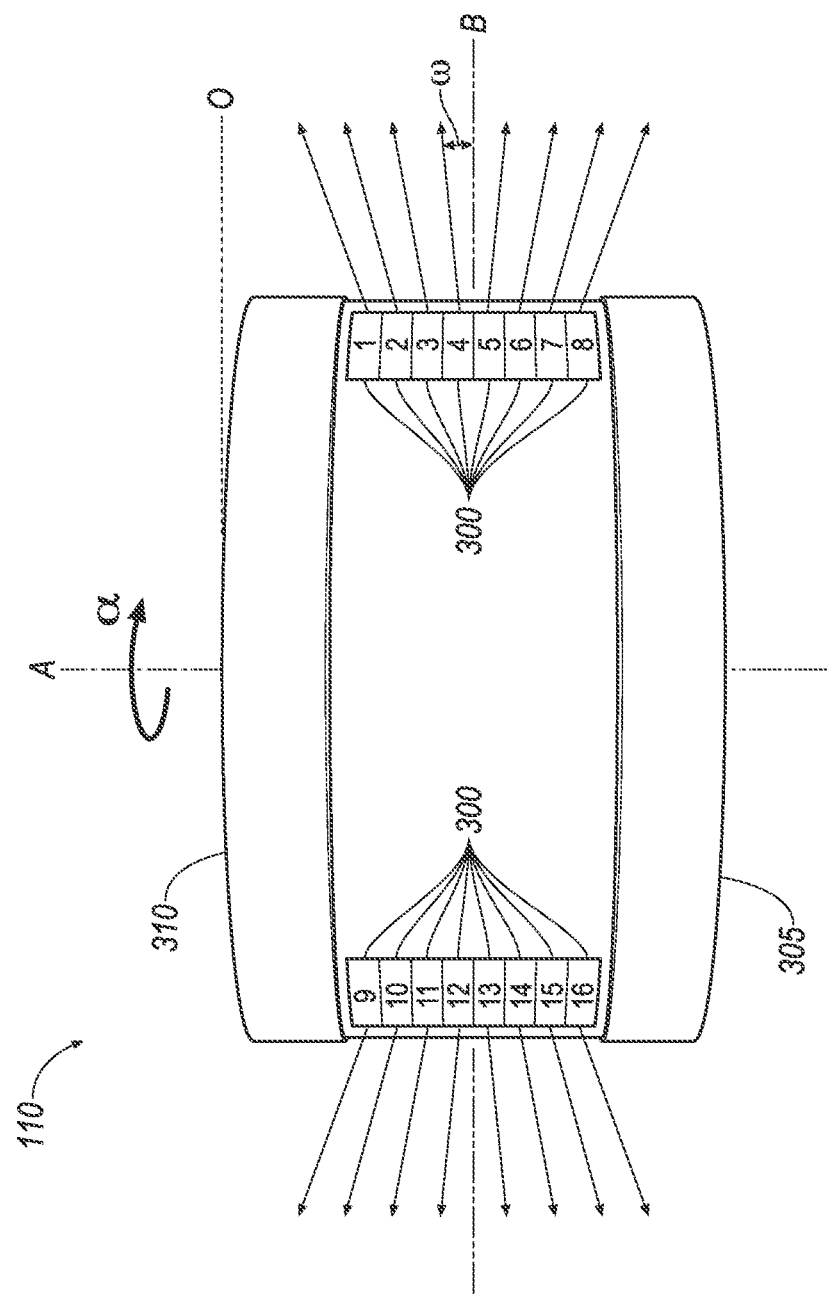
FIG. 3 is a magnified view of the lidar sensor.

FIG. 3 is a magnified view of the lidar sensor 110. The lidar sensor 110 includes a plurality of emitters 300. Each emitter 300 emits a laser. The emitters 300 are arranged in a sequential order and numbered accordingly, e.g., with sequential integers. For example, the emitters 300 shown in FIG. 3 are numbered 1-16, and the processor 120 can actuate the emitters 300 in the sequential order. That is, upon receiving instructions from the computer 105 to collect data 115, the processor 120 can actuate the emitter 300 labeled 1, then the emitter 300 labeled 2, then the emitter 300 labeled 3, and so on until actuating the emitter labeled 16. In the example of FIG. 3, the lidar sensor 110 has 16 emitters 300, and the lidar sensor 110 can have a different number of emitters 300, e.g., 32, 64, 128, etc.

Each emitter 300 has an azimuth α and a specified vertical angle ω. The "azimuth" α is an angle about a vertical axis A of the lidar sensor 110 from a predetermined reference O measured in degrees. During operation, the lidar sensor 110 rotates relative to the vehicle 101 (e.g., to the roof of the vehicle 101), and the azimuth α changes as the lidar sensor 110 rotates. In the example of FIG. 3, emitters 1-8 have an azimuth α of zero degrees and emitters 9-16 have an azimuth α of 180 degrees. Prior to actuating the emitters 300 to emit the lasers, the processor 120 can determine the azimuth α for each emitter 300 based on a rotation angle of the lidar sensor 110 relative to the vehicle 101, e.g., based on data 115 received from an angle sensor 110 between the lidar sensor 110 and the roof of the vehicle 101. The "vertical angle" ω is an angle at which the emitter 300 directs its respective laser relative to an axis B extending from a middle of the lidar sensor 110 between a base 305 and a top 310 of the lidar sensor 110. For example, the emitters 1-4, 9-12 have vertical angles ω greater than zero because the emitters 1-4, 9-12 direct their respective lasers above the axis B, and the emitters 5-8, 13-16 have vertical angles ω less than zero because the emitters 5-8, 13-16 direct their respective lasers below the axis B. The processor 120 can transmit the azimuth α and the vertical angle ω for each emitter 300 to the computer 105.

The lidar sensor 110 can detect objects around the vehicle 100. For each emitter 300 having an azimuth α and vertical angle ω, the processor 120 can determine x, y, z Cartesian coordinates in a coordinate system having an origin at the lidar sensor 110 with conventional coordinate transformations:

$$x = R \cos(\omega)\sin(\alpha) \tag{1}$$

$$y = R \cos(\omega)\cos(\alpha) \tag{2}$$

$$z = R \sin(\omega) \tag{3}$$

where R is the straight-line (or shortest) distance between the lidar sensor 110 and the detected object. The processor 120 can determine R as the speed of light multiplied by a time difference between emission of the laser from the emitter 300 and receipt of the reflected laser, i.e., a direct time-of-flight technique. The x, y, z coordinates are spatial coordinates of a data 115 point detected by the lidar sensor 110 by the laser reflected from the object. Upon collecting a plurality of data 115 points, the computer 105 can detect surfaces of objects that reflect the lasers emitted by the emitters 300, as described below. To reduce an amount of data 115 transmitted by the processor 120 to the computer 105, the processor 120 can transmit only one of the x, y, z coordinates, e.g., the coordinate x, for each emitter 300. The computer 105 can, based on values for α, ω sent by the processor 120 for each emitter 300 and the received value for the coordinate x, determine the distance R and the other coordinates y, z:

$$y = \frac{x}{\tan(\alpha)} \quad (4)$$

$$z = \frac{x\tan(\omega)}{\sin(\alpha)} \quad (5)$$

Alternatively, the processor 120 can send either or both of the y, z coordinates or all three of the x, y, z coordinates to the computer 105.

Based on the coordinates x, y, z, the computer 105 can generate a point cloud to identify objects around the vehicle 100. That is, the computer 105 can plot identified points in a three-dimensional map according to the respective coordinates x, y, z of each point. The map, i.e., a "point cloud," illustrates surfaces of objects that reflect the lasers to the lidar sensor 110. Thus, by analyzing the point cloud, the computer 105 can detect objects near the vehicle 100. That is, the computer 105 can detect a surface of an object near the vehicle 100 with the point cloud, and, with one or more conventional object-avoidance algorithms, operate one or more components to avoid the object detected in the point cloud. The computer 105 can instruct the lidar sensor 110 to collect data 115 while the vehicle 100 is in motion to update the point cloud and detect objects near the vehicle 100.

The processor 120 can determine a nonsequential numerical order for the emitters 300. In this context, a "nonsequential numerical order" is a list of the numbers associated with the emitters 300 that is not a sequential order, i.e., as the numbers would be ordered if ordered according to their values from lowest to highest or vice-versa. That is, the nonsequential numerical order is any order of the numbers associated with the emitters 300 other than the sequential numerical order. In the example of FIG. 3, a nonsequential numerical order for the numbers 1-16 can be, e.g., [10, 16, 9, 7, 11, 12, 4, 2, 3, 8, 1, 15, 5, 14, 13, 6]. As described below, the processor 120 can arrange the data 115 in the memory 125 according to the nonsequential numerical order to improve security of transmission of the data 115 to the computer 105. Alternatively, the processor 120 can actuate the emitters 300 according to the nonsequential numerical order. That is, the processor 120 can actuate the emitter 10, then the emitter 16, then the emitter 9, etc., until all sixteen emitters 300 have been actuated. The processor 120 can record the data 115 in the order of receipt, i.e., in the order in which the processor 120 received the lasers emitted by the emitters 300 in the nonsequential numerical order. The processor 120 can determine the nonsequential numerical order with a conventional random or pseudorandom number generator program, e.g., a FIPS 186-4 standard algorithm, a NIST SP 800-90A algorithm, a stream cipher, a Yarrow algorithm, a Fortuna algorithm, an ANSI X9.17 standard algorithm, etc.

The processor 120 can transmit the nonsequential numerical order to the computer 105 according a secure protocol. In this context, a "secure protocol" is a protocol for sending data 115 that encrypts or otherwise protects the data 115 from interceptors. The secure protocol can be a conventional protocol, e.g., Transmission Control Protocol (TCP), Transport Layer Security (TLS), Secure Sockets Layer (SSL), etc. The secure protocol can include instructions for the computer 105 to send an acknowledgment receipt upon receipt of the nonsequential numerical order. That is, the computer 105 can be programmed to send the acknowledgment receipt to the processor 120 to confirm receipt of the nonsequential numerical order. Using the secure protocol protects the nonsequential numerical order from interceptors. Because the processor 120 only transmits the nonsequential numerical order according to the secure protocol, the amount of processing performed by the processor 120 is reduced compared to encrypting all of the data 115.

The processor 120 can arrange the data 115 into a message according to the nonsequential numerical order. The processor 120 can construct the message as a plurality of segments of data 115, each segment corresponding to data 115 from one of the emitters 300. For example, the processor 120 can construct the message starting with the data 115 from the emitter 10, then the data 115 from the emitter 16, then the data 115 from the emitter 9, etc., according to the nonsequential numerical order shown in the example above. Thus, if the message is intercepted, the interceptor will not likely be able to rearrange the message such that the data 115 are in the sequential numerical order, and a data could generated from the data 115 would not show objects near the vehicle 100. That is, for 16 emitters, there are more than $2 \times 10^{13}$ permutations of the nonsequential numerical order, and a brute force algorithm to determine the specific nonsequential numerical order determined by the processor 120 is extremely likely take much longer than the data 115 may remain relevant, e.g., several millennia at conventional computing speeds. When the data 115 are in the nonsequential numerical order, generating a point cloud with the data 115 would result in a map that appears to be noise and/or randomly selected points, so arranging the data 115 in the nonsequential numerical order improves the security of the data 115. Alternatively, the processor 120 can actuate the emitters 300 according to the nonsequential numerical order, as described above, and arrange the data 115 in the order of actuation of the emitters 300.

The processor 120 can transmit the message according to a conventional protocol, e.g., User Datagram Protocol (UDP). Because the conventional protocol may not include an encryption algorithm to encrypt the message, transmitting the message with the conventional protocol allows the processor 120 to transmit the message to the computer 105 more quickly than encrypting the message with the encryption algorithm prior to sending the message. As described above, if the message is intercepted because the conventional protocol lacks an encryption algorithm, the interceptor would likely not be able to use the data 115 in the message because the resulting point cloud would likely appear to be noise and/or randomly selected points. Because the processor 120 sends the nonsequential numerical order to the computer 105, the computer 105 can read the message and read the data 115 according to the nonsequential numerical order to generate the point cloud.

The processor 120 can transmit a plurality of packets of data 115 in the message. In this context, a "packet" of data 115 is a set of data 115 from the emitters 300 arranged according to a nonsequential numerical order. That is, the processor 120 can actuate the emitters 300 more than once, and each packet includes data 115 received from one actuation of the emitters 300. In the example of FIG. 3 with 16 emitters 300, each packet of data 115 can include one data point from each of the 16 emitters 300. The processor 120 can determine a nonsequential numerical order for each packet of data 115 and arrange the data 115 within the packet according to the respective nonsequential numerical order. That is, the message can include two packets of data 115, each packet arranged according to a different nonsequential numerical order. The processor 120 can send the nonsequential numerical orders to the computer 105, and the computer 105 can read each packet according to its respective nonsequential numerical order, as described below.

The computer 105 can read the message according to the nonsequential numerical order. That is, the computer 105 read each point of data 115 in the message and associate each point of data 115 to the emitter 300 numbered in the nonsequential numerical order. For example, the computer 105 can read the first point of data 115 and the associated number of the nonsequential numerical order, e.g., the emitter 10. The computer 105 can thus determine the coordinates x, y, z of the object detected by the data 115 with the azimuth α and vertical angle ω associated with the emitter 10. The computer 105 can determine the coordinates x, y, z for each of the remaining sets of data 115 in the message with the associated emitters 300 to generate a point cloud showing objects detected by the lidar sensor 110.

Figure 4:
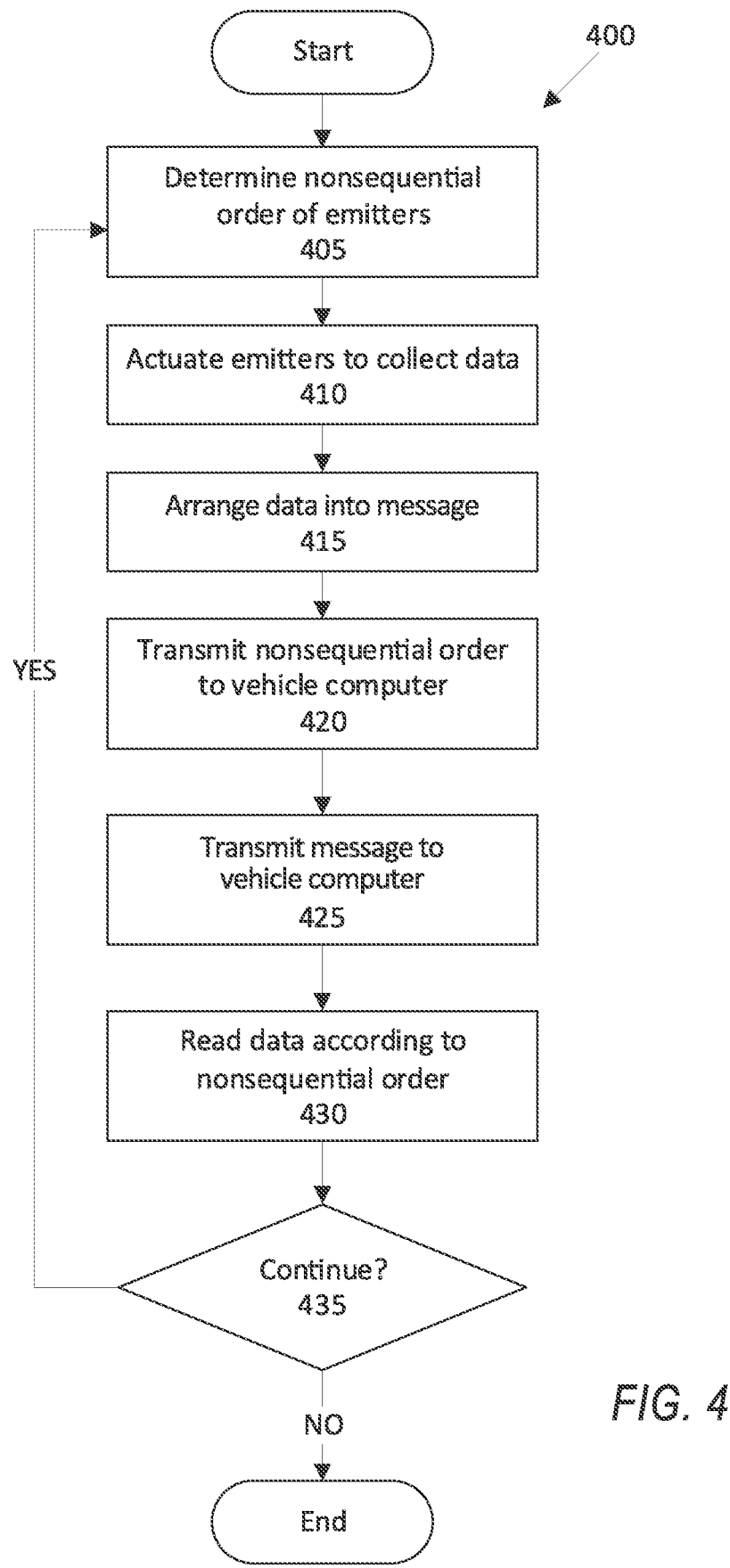
FIG. 4 is a diagram of an example process for operating the lidar sensor.

FIG. 4 is a diagram of an example process 400 for operating a lidar sensor 110 in a vehicle 100. The process 400 begins in a block 405, in which a processor 120 of the lidar sensor 110 determine a nonsequential numerical order. As described above, the nonsequential numerical order allows the processor 120 to arrange data 115 corresponding to sequentially arranged emitters 300.

Next, in a block 410, the processor 120 actuates the emitters 300 to collect data 115. The emitters 300 emit a laser that reflects from a surface of a nearby object and returns to the emitter 300. Based on a time of flight between emission and receipt of the laser, the processor 120 can determine a distance between the emitter 300 and the object. As described above, the processor 120 can actuate the emitters 300 sequentially, i.e., in a sequential numerical order. Alternatively, the processor 120 can actuate the emitters 300 in the nonsequential numerical order.

Next, in a block 415, the processor 120 arranges the data 115 into a message. The processor 120 can arrange the data 115 according to the nonsequential order. That is, the processor 120 can arrange the sequentially recorded data 115 in a message according to the nonsequential order. Alternatively, if the processor 120 actuate the emitters 300 according to the nonsequential order, the processor 120 can arrange the data 115 in the message in the order of receipt of the data 115.

Next, in a block 420, the processor 120 transmits the nonsequential order to a computer 105 of the vehicle 100. As described above, the processor 120 can transmit the nonsequential order according to a secure protocol to improve security of the transmission. The secure protocol can be a conventional protocol, e.g., Transmission Control Protocol (TCP), Transport Layer Security (TLS), Secure Sockets Layer (SSL), etc. The secure protocol can include instructions for the computer 105 to send an acknowledgment receipt upon receipt of the nonsequential numerical order. That is, the computer 105 can be programmed to send the acknowledgment receipt to the processor 120 to confirm receipt of the nonsequential numerical order.

Next, in a block 425, the processor 120 transmits the message to the computer 105. The processor 120 can transmit the message according to a conventional protocol without additional security measures. That is, by arranging the data 115 in the nonsequential numerical order, the processor 120 improves the security of the message without applying a security measure such as an encryption algorithm that can be computationally intensive.

Next, in a block 430, the computer 105 reads the message according to the nonsequential order. As described above, the computer 105 can read the data 115 in the message an associate each data point to the respective number in the nonsequential numerical order. For example, when the nonsequential numerical order starts [10, 16, 9], the computer 105 can associate the data point with the emitter 10, the second data point with the emitter 16, and the third data point with the emitter 9. Thus, the computer 105 can generate a point cloud and identify objects near the vehicle 100.

Next, in a block 435, the processor 120 determines whether to continue the process 400. The processor 120 can determine to continue the process 400 when the computer 105 instructs the processor 120 to collect more data 115. If the processor 120 determines to continue, the process 400 returns to the block 405. Otherwise, the process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising:
   a sensor including a plurality of sequentially arranged emitters, wherein each emitter is arranged at a different angle relative to an axis extending between a base of the sensor and a top of the sensor;
   a vehicle computer in communication with the sensor;
   means for arranging data collected by the emitters according to a nonsequential numerical order of the emitters;
   means for transmitting a message listing the nonsequential numerical order according to a secure protocol;
   means for transmitting the data to the vehicle computer according to a second protocol that is different than the secure protocol; and
   means for identifying the angle of each emitter based on a number in the nonsequential numerical order corresponding to the emitter.

2. The system of claim 1, further comprising means for reading the transmitted data according to the transmitted nonsequential numerical order.

3. The system of claim 1, further comprising means for transmitting a plurality of packets of data, each packet having respective data arranged according to a different nonsequential numerical order.

4. A system, comprising a computer including a processor and a memory, the memory storing instructions executable by the processor to:
   arrange data collected by a plurality of sequentially arranged emitters in a sensor according to a nonsequential numerical order of the emitters, wherein each emitter is arranged at a different angle relative to an axis extending between a base of the sensor and a top of the sensor;
   transmit a message listing the nonsequential numerical order to a vehicle computer according to a secure protocol;
   transmit the data to the vehicle computer according to a second protocol that is different than the secure protocol; and
   identify the angle of each emitter based on a number in the nonsequential numerical order corresponding to the emitter.

5. The system of claim 4, wherein the vehicle computer is programmed to read the transmitted data according to the transmitted nonsequential numerical order.

6. The system of claim 4, wherein the vehicle computer is programmed to generate a point cloud based on the data.

7. The system of claim 4, wherein the instructions further include instructions to transmit a plurality of packets of data according to the second protocol, each packet having respective data arranged according to a different nonsequential numerical order, and a respective message with each nonsequential numerical order according to the secure protocol.

8. The system of claim 4, wherein the instructions further include instructions to actuate the emitters in the nonsequential numerical order.

9. The system of claim 4, wherein the vehicle computer is programmed to send an acknowledgment receipt to the computer upon receiving the nonsequential numerical order.

10. The system of claim 4, wherein the sensor is a lidar.

11. The system of claim 4, wherein the instructions further include instructions to determine the nonsequential numerical order with a random number generator program.

12. A method, comprising:
    arranging data collected by a plurality of sequentially arranged emitters in a sensor according to a nonsequential numerical order of the emitters, wherein each emitter is arranged at a different angle relative to an axis extending between a base of the sensor and a top of the sensor;
    transmitting a message listing the nonsequential numerical order to a vehicle computer according to a secure protocol;
    transmitting the data to the vehicle computer according to a second protocol that is different than the secure protocol; and
    identifying the angle of each emitter based on a number in the nonsequential numerical order corresponding to the emitter.

13. The method of claim 12, further comprising transmitting a plurality of packets of data, each packet having respective data arranged according to a different nonsequential numerical order.

14. The system of claim 4, wherein the instructions transmit the message listing the nonsequential numerical order to the vehicle computer according to the secure protocol further include instructions to input the nonsequential numerical order to an encryption algorithm to generate an encrypted list and to transmit the encrypted list to the vehicle computer.

* * * * *